(12) United States Patent
Grott

(10) Patent No.: US 6,234,403 B1
(45) Date of Patent: *May 22, 2001

(54) SPRINKLER WATER CONSERVATION DEVICE

(76) Inventor: Frank S. Grott, 2804 Via Paloma Dr., Punta Gorda, FL (US) 33950

( * ) Notice: Subject to any disclaimer, the term of this patent is extended or adjusted under 35 U.S.C. 154(b) by 0 days.

This patent is subject to a terminal disclaimer.

(21) Appl. No.: 09/480,579

(22) Filed: Jan. 10, 2000

Related U.S. Application Data

(63) Continuation of application No. 09/225,285, filed on Jan. 4, 1999, now Pat. No. 6,019,290.

(51) Int. Cl.[7] .................................................... A01G 25/00
(52) U.S. Cl. .............................. 239/63; 239/71; 137/73.8; 340/602
(58) Field of Search .................................. 239/63, 67, 71; 137/78.2, 78.3; 340/602, 604, 601; 116/173; 73/73

(56) References Cited

U.S. PATENT DOCUMENTS

| | | | | |
|---|---|---|---|---|
| 3,114,143 | * | 12/1963 | Winters | 239/63 |
| 4,396,149 | * | 8/1983 | Hirsch | 239/63 |
| 5,813,606 | * | 9/1998 | Ziff | 239/63 |
| 6,019,290 | * | 2/2000 | Grott | 239/63 |

* cited by examiner

Primary Examiner—David A. Scherbel
Assistant Examiner—Dinh Q. Nguyen
(74) Attorney, Agent, or Firm—Frank A. Lukasik

(57) ABSTRACT

The invention is directed to a system for controlling lawn and garden watering by using electronic sensors to detect the moisture in a lawn. A probe determines the soil water content and powers a signaling device which operates switches for either signaling the need for more water or to stop watering to prevent over-watering. The status of the moisture in the soil is indicated by raising a flag or lighting a strobe light for a visual signal.

13 Claims, 8 Drawing Sheets

SPRINKLER WATER CONSERVATION DEVICE

RELATED INVENTION

This application is a continuation of U.S. Ser. No. 09/225,285, filed Jan. 4, 1999, now U.S. Pat. No. 6,019,290, Issued Feb. 1, 2000.

BACKGROUND OF THE INVENTION

1. Field of the Invention

The invention relates to lawn sprinklers, and more specifically, the invention relates to an electro-mechanical system for determining the moisture content of the soil for manual watering and for controlling lawn sprinkler systems.

2. Background of the Invention.

In the past, it has been a well known practice to provide automatic watering devices, such as sprinklers, in order to supply plants with a proper amount of moisture so that the plants or natural growth will flourish. by providing a plant with too little or too much water, its growth progresses or life span will be impeded. Since the proper amount of moisture varies not only among different types of growth, but with the particular environment in which the plant is growing, it is time consuming process to manually supply the necessary water. Automatic or manual devices for providing the necessary water to the plant life are highly desirable and time saving devices.

For example, a conventional system employs a timer controller which operates a solenoid valve incorporated into a water system so that when the time as arbitrarily set by the user arrives, power is supplied via the solenoid to the water supply valve so that water is then supplied to a system of sprinklers or other irrigation devices. However, water may be supplied even though the ground or plant medium is saturated such as subsequent to a heavy rain or the like.

Therefore, a long standing need is present to incorporate into automatic water sprinkling systems, a detection device or apparatus which functions in conjunction with the timer to operate the water supply valve in response to the moisture content of the soil or plant medium.

U.S. Pat. No. 2,906,952 to Horecky discloses a device for measuring and regulating moisture content of soil comprising a by-pass circuit, separate from a primary circuit, and which by-pass circuit includes a probe or the like adapted to be easily inserted into the ground so that the degree of resistance to passage of electricity through the soil and through the by-pass circuit, and the extent of its conductivity may be measured and visually indicated on a meter of the device. A neon light is used to provide a visual signal.

U.S. Pat. No. 3,114,243 to Winters discloses an automatic system of agricultural irrigation comprising a moisture sensing probe, having an indicator. The indicator includes a needle which is pivoted for rotation about a center of a dial indicating the percentages of moisture at the tip of the probe. The probe is modified by providing a cover over the needle of a transparent insulating material which has a hole in the center coaxial with the pivot axis of the needle. A stop arm of a conductive material is mounted so that it intercepts the travel of the needle as the needle moves from one percentage indication to another.

U.S. Pat. No. 3,867,837 to Malin discloses a moisture detector comprising a container surrounding a detection area with a channel leading out of the container, a member connected in the channel with a portion of the member inside the container and a portion of the member outside the container, and a switch connected adjacent the distal end of the portion of the member lying inside the container. The change in weight of the member changes the position of the distal end of the portion of the member lying inside the container to activate the switch to signal a variation in the moisture content of the soil surrounding the portion of the member lying outside the container.

U.S. Pat. No. 4,055,200 to Lohoff discloses a soil moisture detector incorporated between a timer controller and an electrical water supply valve. The detector includes a pneumatic diaphram apparatus whereby a pressure level is maintained or released between a pair of diaphram in response to a moisture sensing valve buried in the ground. The pneumatic condition of the detector opens or closes a switch to supply voltage to the water supply valve.

U.S. Pat. No. 4,253,606 to Johnson discloses a spring loaded mechanism which opens the valve when released by a water sensitive element which monitors the moisture of the ground. A closing mechanism, which is actuated by water flowing through the valve automatically resets the spring loaded opening mechanism and closes the valve after a fixed quantity of water flow.

The instant invention is designed to overcome the problems and difficulties with prior art watering and automatic moisture supplying devices which are obviated by the present invention.

SUMMARY OF THE INVENTION

The instant invention consists of an electro-mechanical means for determining the moisture content of the soil for manual watering and for controlling lawn sprinkler systems either directly by direct interaction with said system or indirectly by signaling an operator of the need to water a lawn or garden, or alternately, to cease watering. With the rising cost and increasing scarcity of water, there is a very real need to conserve it and various municipalities are severely restricting the use of water for lawns and gardens. Existing technology for controlling underground sprinkler systems consists of simple clock timers or more elaborate electronic monitors which can be pre-programmed to activate the system for a specific period.

Because such devices are arbitrarily set to operate based on a time period of activation and not on the actual conditions which exist vis-a-vis the moisture level at the critical root level of the grass or plant, the anomaly exists wherein watering often is activated during rain storms thus wasting water, or not activated for long enough, thus drying out the grass or garden. Not until the creation of the instant invention, a water conservation device, has there been an economical and practical means for signaling an operator of the need to water a lawn or garden, or activating and de-activating sprinkler systems based upon the moisture content of soil at the critical root level of plants or lawns. Said water conservation device, as will be shown below in its various embodiments can be used to signal the need for watering or activate the sprinklers automatically, conversely, it can signal the need to stop watering or can de-activate the sprinklers automatically. Although the following description discloses a variety of signal/activation configurations as examples, alternative configurations and signaling means are possible such as different flags, lights, signs, or switching mechanisms, all based upon the central components of the instant invention which senses and is activated according to the moisture content at root level. The instant invention is readily adaptable to existing underground watering systems and can be adjusted to monitor different zones of a lawn and their respective water requirements. By determining the exact moisture requirements of a lawn or garden, it is possible to deliver with the instant invention, the correct amount of water just sufficient to the needs of plants without wasting water.

DETAILED DESCRIPTION OF THE PREFERRED EMBODIMENTS

Figure 1:
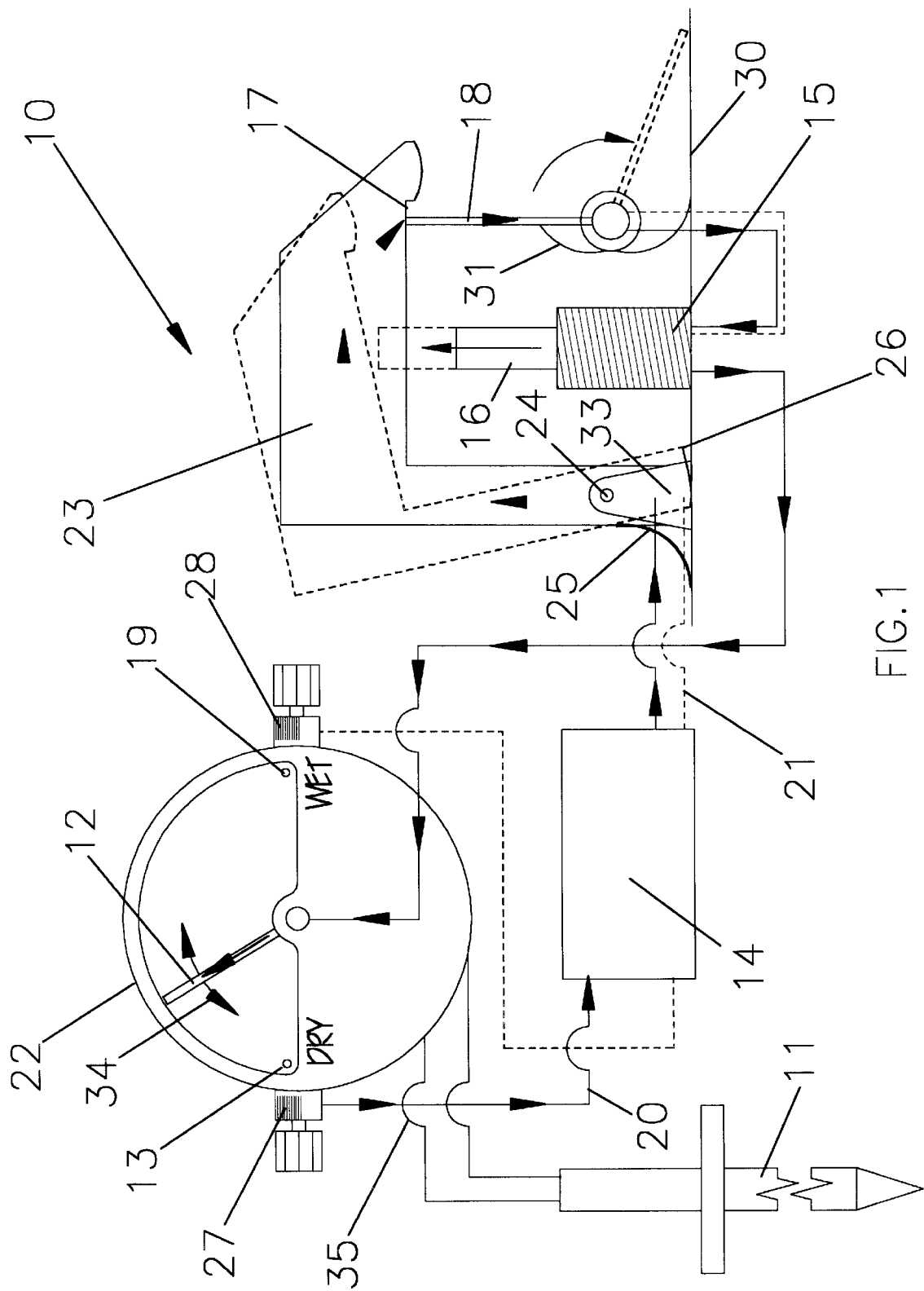
FIG. 1. is a schematic illustration of the sprinkler water conservation device in accordance with the invention.

Referring now to the drawings wherein like numerals designate like and corresponding parts throughout the several views, in FIG. 1 the instant invention water conservation device 10 is disclosed in a diagrammatic view to show the basic mechanism by which an electronic signal from probe 11 is converted through various electrical and mechanical components into a switching/signaling means by which a lawn watering system may be activated directly or by which an operator may be alerted to the need to manually activate the watering system. Probe 11, through electronic means well established as existing technology, determines the water content of soil into which it is inserted. Through circuit 35 an electronic signal is conducted to the inner circuitry of an analog display 22 which utilizes needle 12 traveling in directions of arrows 34 and acts both as a signaling and a conducting means by which calibration can be effected. In the event of dry conditions at root level, needle 12, which has been calibrated correctly using adjustment 27, falls towards "Dry" terminal 13 whereupon electrical circuit 20 is closed. Electrical energy from battery 14 is released through the circuit 20 and energizes solenoid coil 15 sending solenoid core 16 upwards to strike trigger arm 23. Trigger arm 23 being rotatably supported by pivot pin 24 on base 33, rises away from flag arm 18 thereby releasing stored kinetic energy in coil spring 31 causing flag arm 18 to rotate until it comes to rest against the base of housing unit 30.

Figure 2:
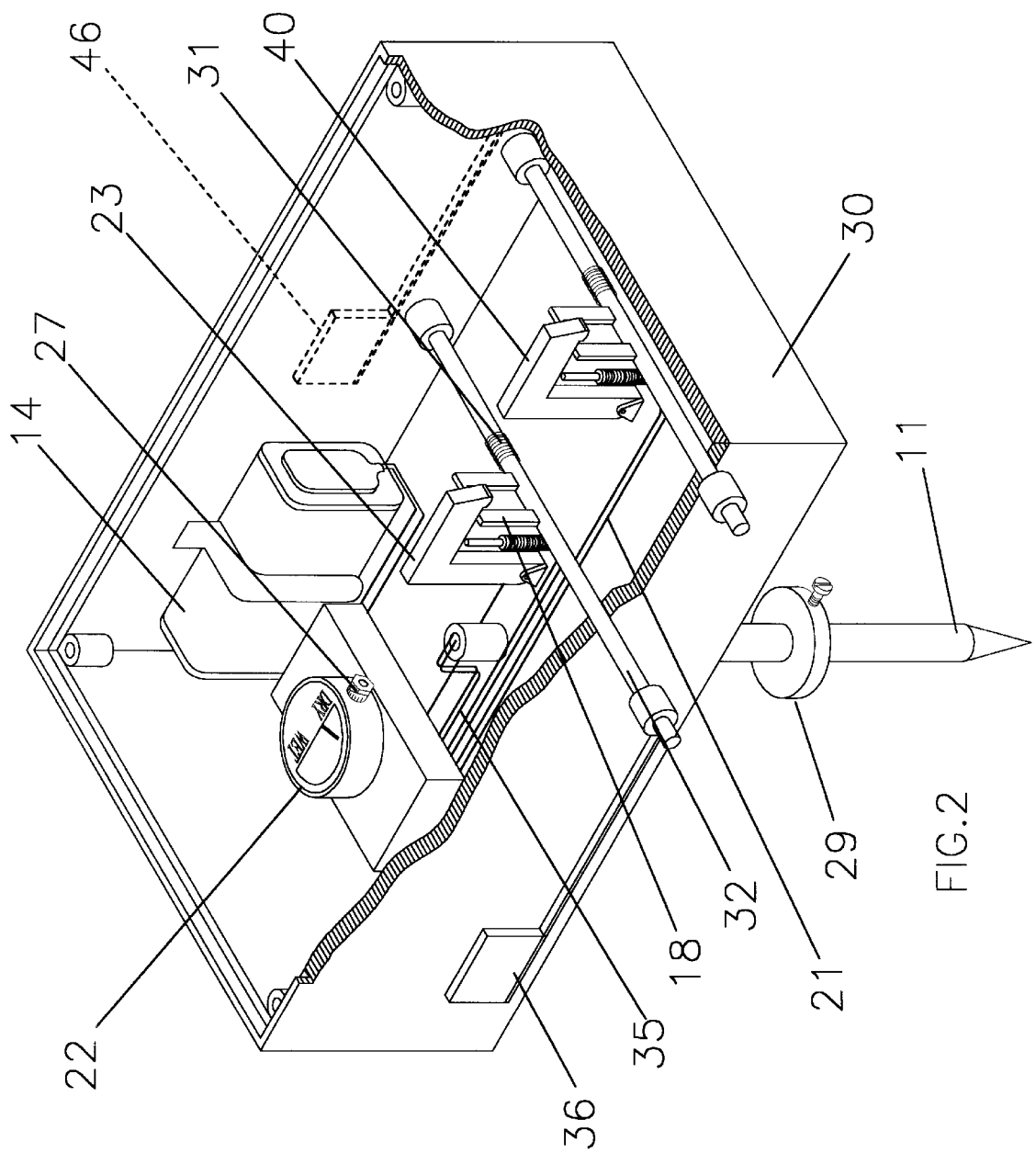
FIG. 2. is a perspective view, partially in section of a first embodiment of the invention having an analog activation dial in accordance with the invention.

Simultaneously with the rotating of flag arm 18 and the raising of trigger arm 23 are the raising of signal flag 36 FIG. 2) and the breaking of circuit 20. The circuit breaking is a conservation means for preserving battery life.

Figure 4:
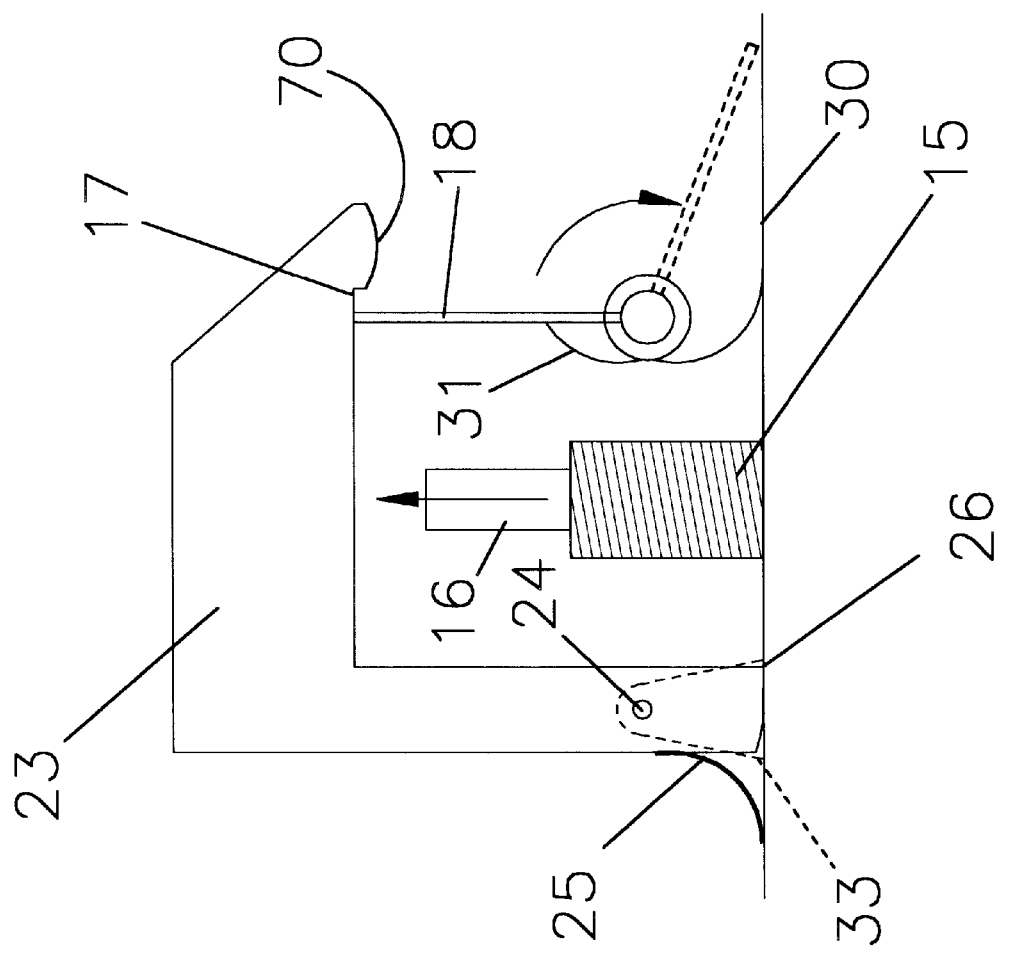
FIG. 4. is a side view, partially in section, of the electromechanical trigger mechanism in accordance with the invention.

Referring now to FIG. 4, trigger arm 23 in its ready position is held upright by gentle pressure from leaf spring 25 which rests against the floor of housing 30 at one end and is affixed to the rear face of trigger arm 23 at the other end. Trigger arm 23 cannot fall forward away from spring 25 because its front edge 26 rests against the floor of housing 30. A radius away form face 26 provides clearance sufficient for the rearward rotation of trigger arm 23 without it binding against housing 30. Manual resetting of the trigger arm 23 and flag arm 18 is effected by rotating flag 36 (FIG. 2) back into the ready position, this causes flag arm 18 to rotate in a reverse direction, thus pushing trigger 23 back against the tension of spring 25. Radius 70 on trigger arm 23 allows the end of flag arm 18 to ride smoothly into its ready position in trigger notch 17. For signaling (or de-activating sprinklers) under wet conditions wherein watering must end, the same procedure as described is used, however, circuit 21 is now used and activation of the above procedure is commenced by contact of needle 12 with "Wet" terminal 19 which has been correctly calibrated with wet adjustment 28. FIG. 2 shows wet condition flag 46 connected to "Wet" activation device 40.

Figure 3:
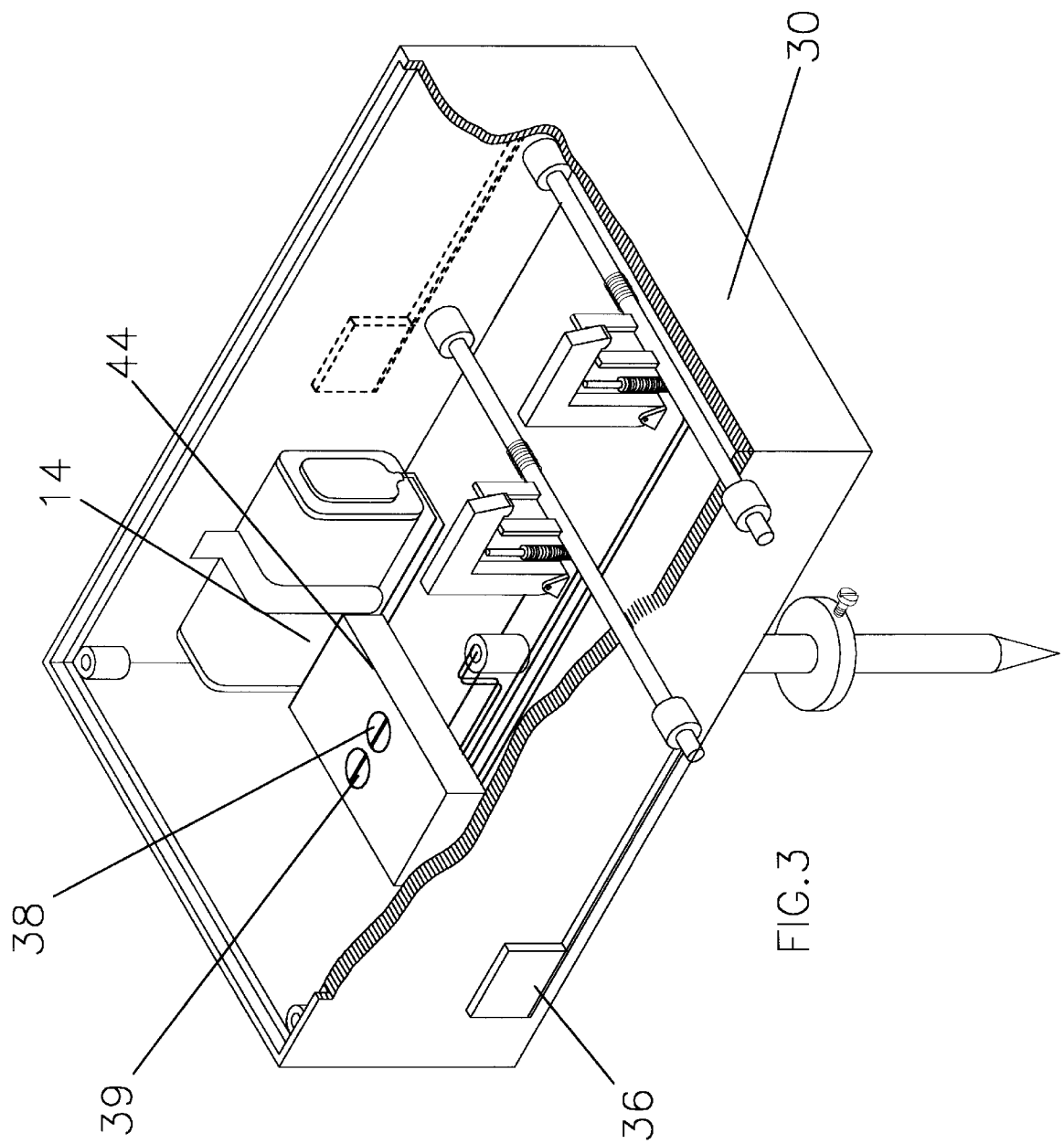
FIG. 3. is a perspective view, partially in section, of a first embodiment of the invention having an electronic activation unit.

Referring to FIG. 3, an alternate embodiment utilizes an electronic control means 44 for activating the trigger circuitry. Said control means being calibrated by "Dry" calibration screw 38 and "Wet" calibration 39. All of the controls, including signaling and switch controls may be operated by a digital control.

Figure 5:
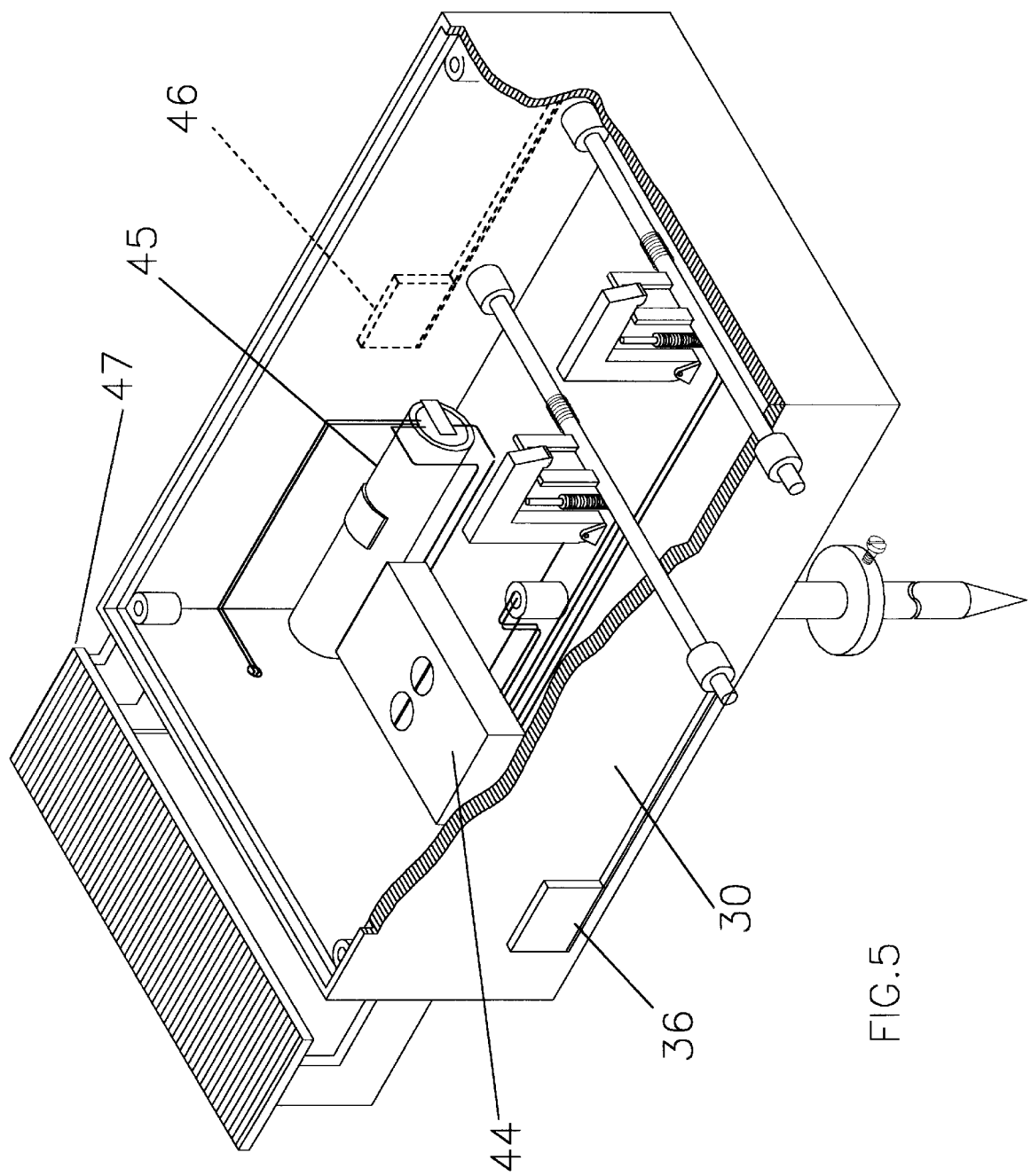
FIG. 5. is a perspective view, partially in section, of a second embodiment having a solar array panel in accordance with the invention.

Referring to FIG. 5, an alternate power supply means is provided by the combination of a solar array panel 47 and battery 14 or condenser 45 wherein electrical energy is collected by said solar array panel 47 and stored within the condenser 45 or battery 14, which ever is used until electronic circuit 44 as previously described in FIG. 3 activates water conservation device 10.

Figure 6:
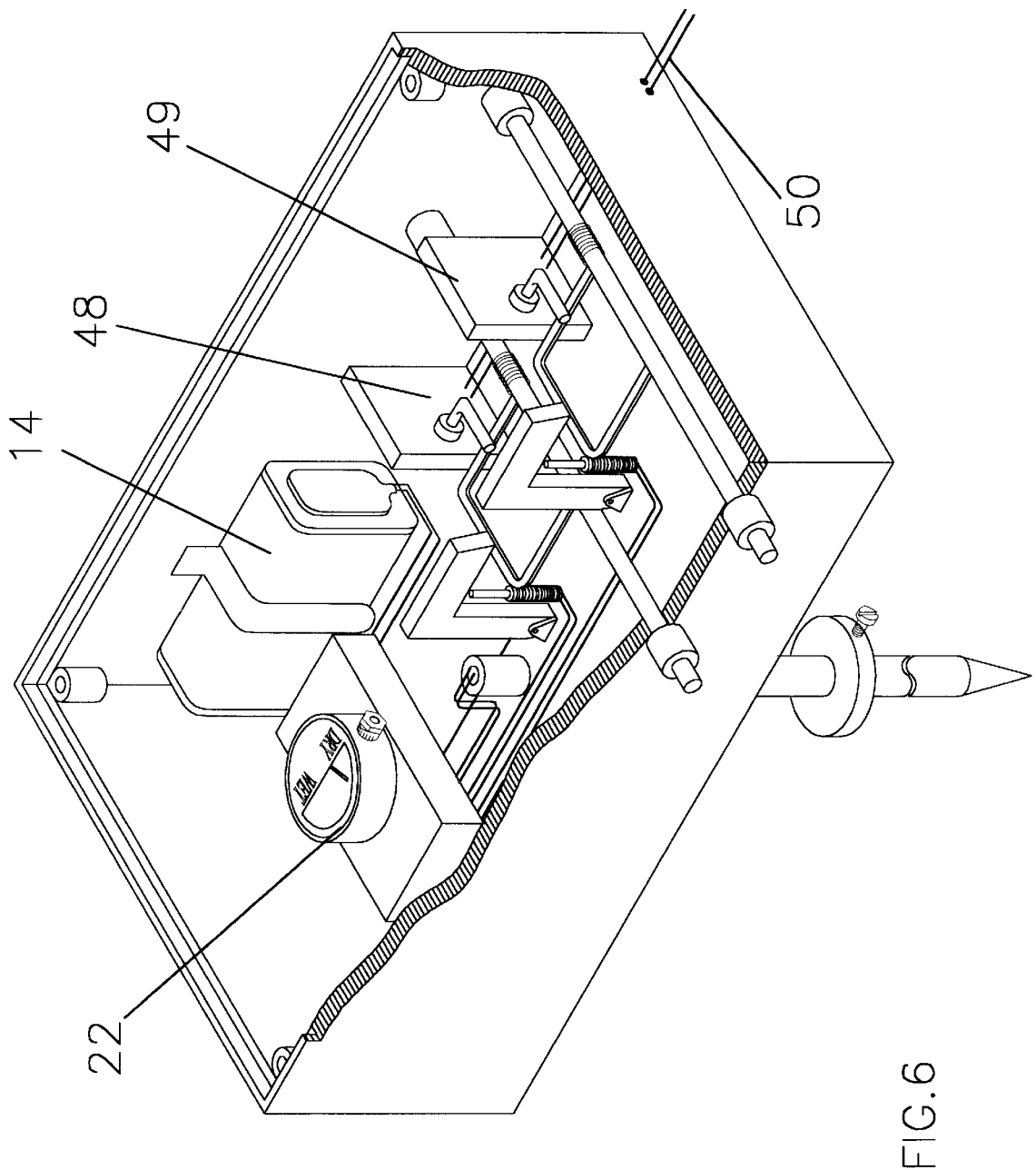
FIG. 6. is a perspective view, partially in section, of an alternative embodiment of the invention showing a double set of mechanical switches in accordance with the invention.
Figure 7:
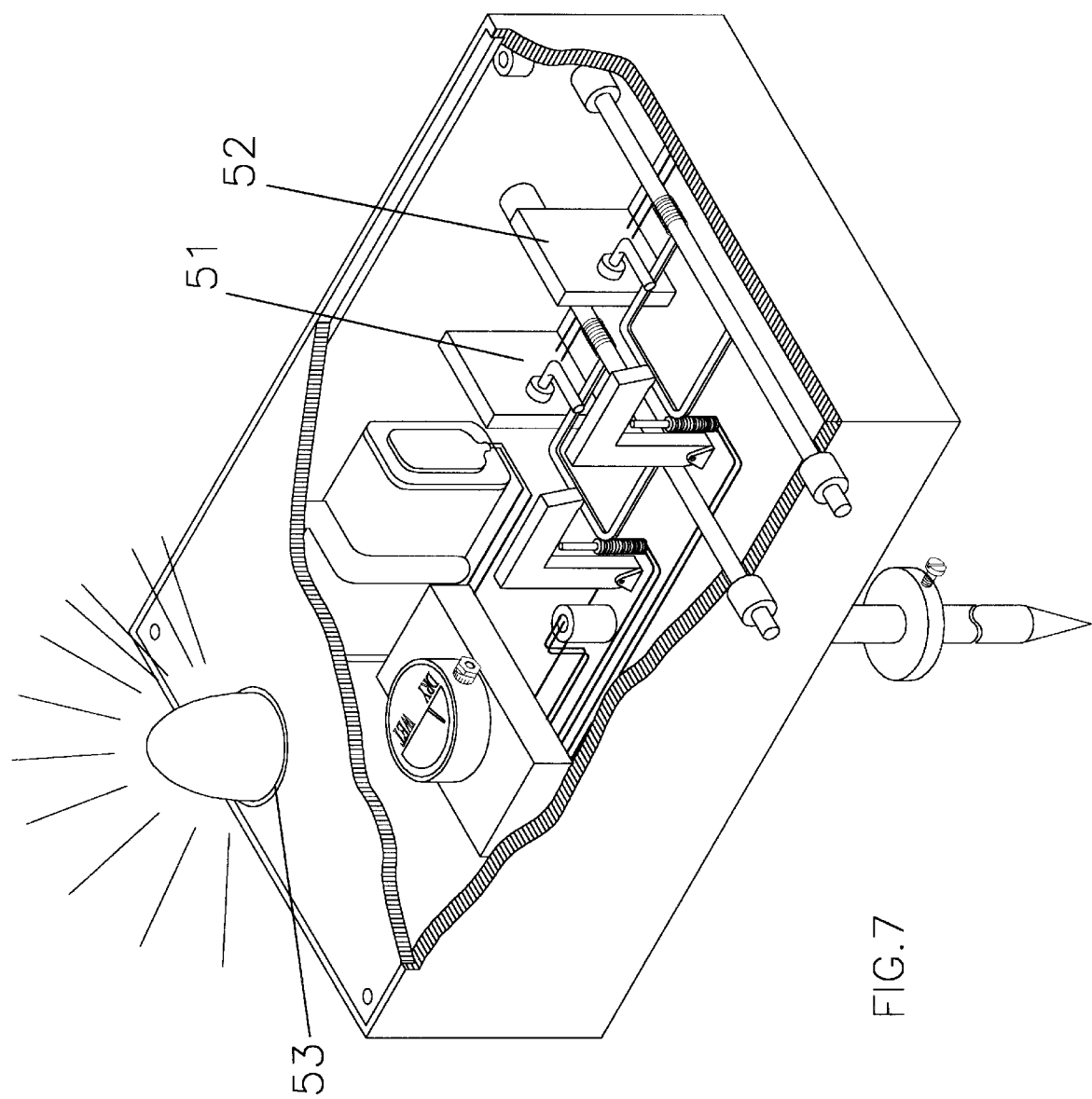
FIG. 7. is a perspective view, partially in section, of an alternate embodiment of the attachment apparatus showing a strobe light in accordance with the invention.

In FIG. 6 the same sensor/activation means as described above is used with the modification of adding "on" switch 48 and "off" switch 49 connected to transmission wires 50 for remote control of the sprinkler system to which wires 50 are directly connected. For use solely as a signal device to notify attendant of the need to start or stop watering, FIG. 7 incorporates a strobe or flashing light 53. On and off switches 51 and 52 respectively, activate the light when water is required and deactivate it when the soil has sufficient water.

Figures 8, 9:
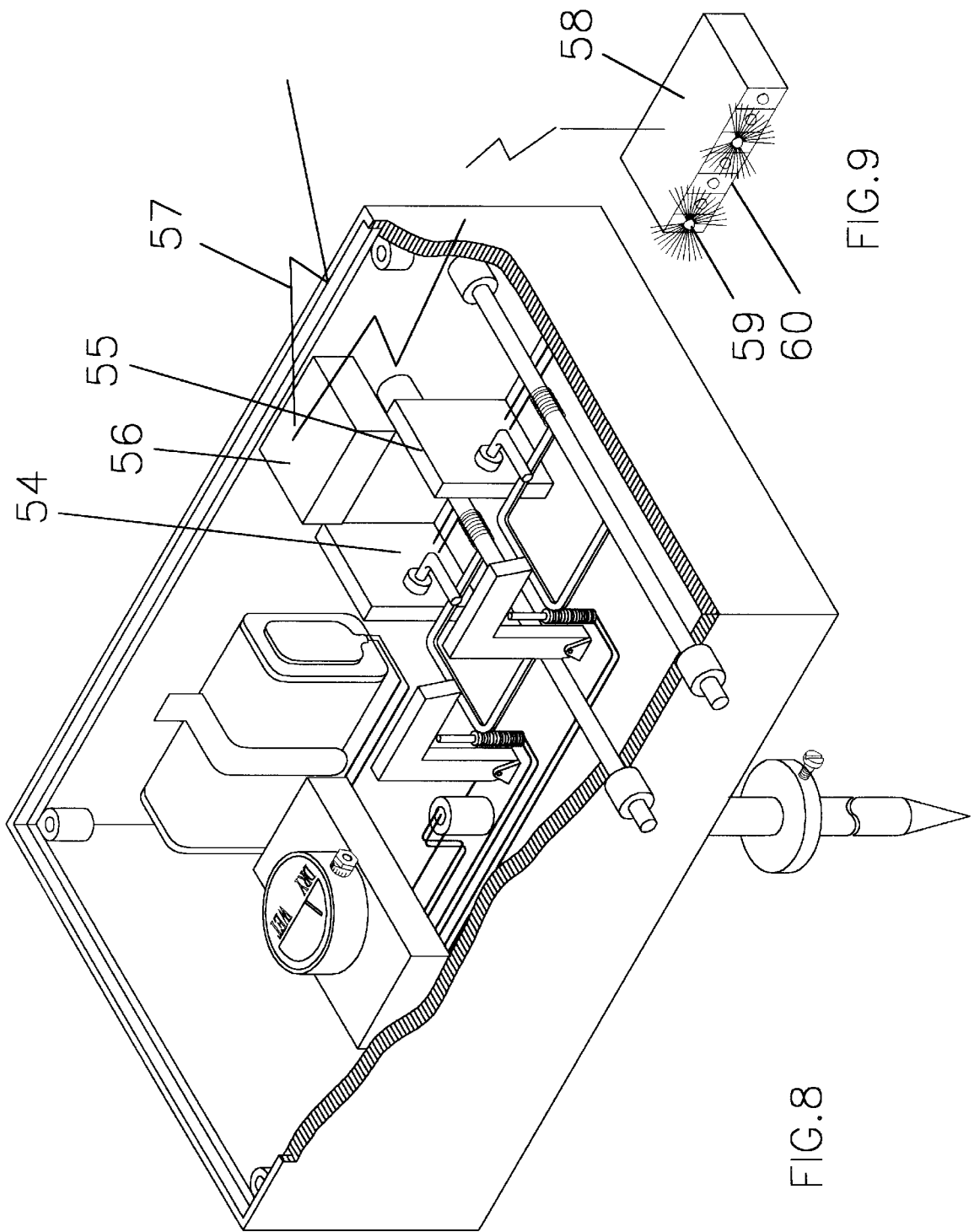
FIG. 8 is a perspective view, partially in section, of an alternative embodiment showing a mechanically switched R/F transmitter in accordance with the invention.
FIG. 9 is a perspective view of a remote receiver with an array of signal LEDs denoting zones requiring or not requiring water.

Referring to FIGS. 8–9, an RF transmitter 56 is switched on and off by control switches 54 and 55. When activated, transmitter 56 sends an R/F signal to R/F receiver 58 (FIG. 9) which activates signal LED 59 on LED array 60. This acts as a visual signal of the need to water or stop watering in a particular zone. Said receiver 58 can also serve as an electronic switching means to directly activate and de-activate the existing sprinkler system. Each zone sensor probe 11 may have its own radio frequency to enable its zone to operate independently from the other zones.

The entire water conservation device 10 may be remotely mounted, such as wall-mounted, with the moisture probe 11 remotely positioned and still be electrically or electronically connected so that concerns of damage such as from a lawn mower may be eliminated. An advantage of this configuration is the facility to water selected zones of a lawn independently of each other according to each zone's water requirements.

Thus it will be appreciated that the present invention provides a novel sprinkler water conservation device which can be used with most watering systems. It is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. A system for controlling lawn and garden watering by using electronic probes, said system consisting of:

base means for mounting and containing said system, power supply means for powering said system, mounted on said base, signaling means mounted within said base means for calibrating and adjusting said system for soil water content, probe means for determining the water content of soil, said probe means connected to said signaling means, a first trigger arm rotatably mounted on said base means, said trigger arm being biased against rotation by a leaf spring, a first solenoid coil mounted on said base for operating said first trigger arm in response to said signaling means, a first flag arm operatively connected to said first trigger arm and having a flag mounted on a first end, said first flag arm having spring means for rotating said flag arm, a second trigger arm rotatably mounted on said base means, said trigger arm being biased against rotation by a leaf spring, a second solenoid coil mounted on said base for operating said second trigger arm in response to said signaling means, and a second flag arm operatively connected to said second trigger arm, said second flag arm having spring means for rotating said second flag arm.

2. A system for controlling lawn and garden watering as recited in claim 1 wherein said signaling means consists of an analog display and a first and second contact, and having switching means mounted on a needle for activating each of said first and second solenoid coils as determined by said probe means.

3. A system for controlling lawn and garden watering as recited in claim 1 wherein said signaling means consists of a digital, electronic control.

4. A system for controlling lawn and garden watering as recited in claim 1 wherein said power supply consists of a solar array panel.

5. A system for controlling lawn and garden watering as recited in claim 1 wherein said power supply consists of an external voltage for operating said probe means.

6. A system for controlling lawn and garden watering as recited in claim 1 wherein said power supply means consists of a solar array panel and a battery wherein electrical energy is collected by said solar array panel and stored within said battery.

7. A system for controlling lawn and garden watering as recited in claim 1 wherein said power supply means consists of a solar array panel and a condenser wherein electrical energy is collected by said solar array panel and stored within said condenser.

8. A system for controlling lawn and garden watering as recited in claim 1 wherein sprinkler control "Off" and "On" switches are mounted on said base and controlled by said first and second flag arms.

9. A system for controlling lawn and garden watering as recited in claim 8 wherein an R/F transmitter is mounted on -said base and controlled by said "Off" and "On" switches and an R/F receiver electronic switching means providing a signal and directly activating and de-activating said watering system.

10. A system for controlling lawn and garden watering as recited in claim 1 wherein sprinkler control "OFF" and "ON" switches are mounted on said base and controlled by electronic signaling means.

11. A system for controlling lawn and garden watering as recited in claim 1 wherein a low voltage strobe light and "Off" and "On" switches are mounted on said base and controlled by said first and second flag arms.

12. A system for controlling lawn and garden watering as recited in claim 1 wherein said system is mounted remotely from said probe means and communicating with said probe means.

13. A system for controlling lawn and garden watering as recited in claim 1 wherein said probe means consists of a plurality of moisture probes, each probe having a distinct signal indicating the condition of the surrounding soil.

* * * * *